(12) United States Patent  
Hara (10) Patent No.: US 6,918,408 B2  
(45) Date of Patent: Jul. 19, 2005

(54) VALVE DRIVING DEVICE (75) Inventor: Tetsuhiko Hara, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 198 days.

(21) Appl. No.: 10/360,389

(22) Filed: Feb. 7, 2003

(65) Prior Publication Data

US 2003/0150495 A1 Aug. 14, 2003

(30) Foreign Application Priority Data

Feb. 12, 2002 (JP) ........................................ 2002-033564

(51) Int. Cl.[7] .............................................. F16K 11/16
(52) U.S. Cl. ........................ 137/597; 137/862; 137/870
(58) Field of Search ............................ 137/597, 625.13, 137/625.15, 862, 870, 864

(56) References Cited

U.S. PATENT DOCUMENTS 2,062,855 A * 12/1936 Yeager ........................ 431/280
4,287,908 A * 9/1981 Storgard ...................... 137/255
4,570,663 A * 2/1986 Gould et al. ............ 137/119.07
6,058,726 A * 5/2000 Noritake ...................... 62/186
6,158,713 A * 12/2000 Ohya et al. .................... 251/65

FOREIGN PATENT DOCUMENTS

JP    2001-153253    6/2001

* cited by examiner

Primary Examiner—Stephen M. Hepperle  
(74) Attorney, Agent, or Firm—Reed Smith LLP (57) ABSTRACT A valve driving device comprises a main case having one or more inlet pipes through which a fluid flows in from an external compressor and two or more outlet pipes through which the fluid flows out and also having built-in valve elements to open and close openings that are portions of a fluid path for the fluid and are connected to the outlet pipes to flow and stop the fluid and a driving portion for driving the valve elements. When the driving portion is driven in the driving direction, the openings and the valve elements together can switch between four operation modes (close-close, open-close, close-open, and open-open) with respect to the two outlet pipes; three or more of the operation modes, including the close-close mode, being obtained; the driving portion is driven back and forth while two modes of the three or more modes are assigned to be at both ends of the driving direction; and the close-close mode is assigned to be at one of the ends.

2 Claims, 6 Drawing Sheets

PRIOR ART

PRIOR ART

VALVE DRIVING DEVICE

CROSS-REFERENCE TO RELATED APPLICATIONS

This application claims priority of Japanese Application No. 2002-033564, filed Feb. 12, 2002, the complete disclosure of which is hereby incorporated by reference.

BACKGROUND OF THE INVENTION a) Field of the Invention

The present invention relates to a valve driving device which is used in a refrigerator compressor. Specifically, it relates to the open-close operational modes of a three-way valve.

b) Description of the Related Art

Figure 5:
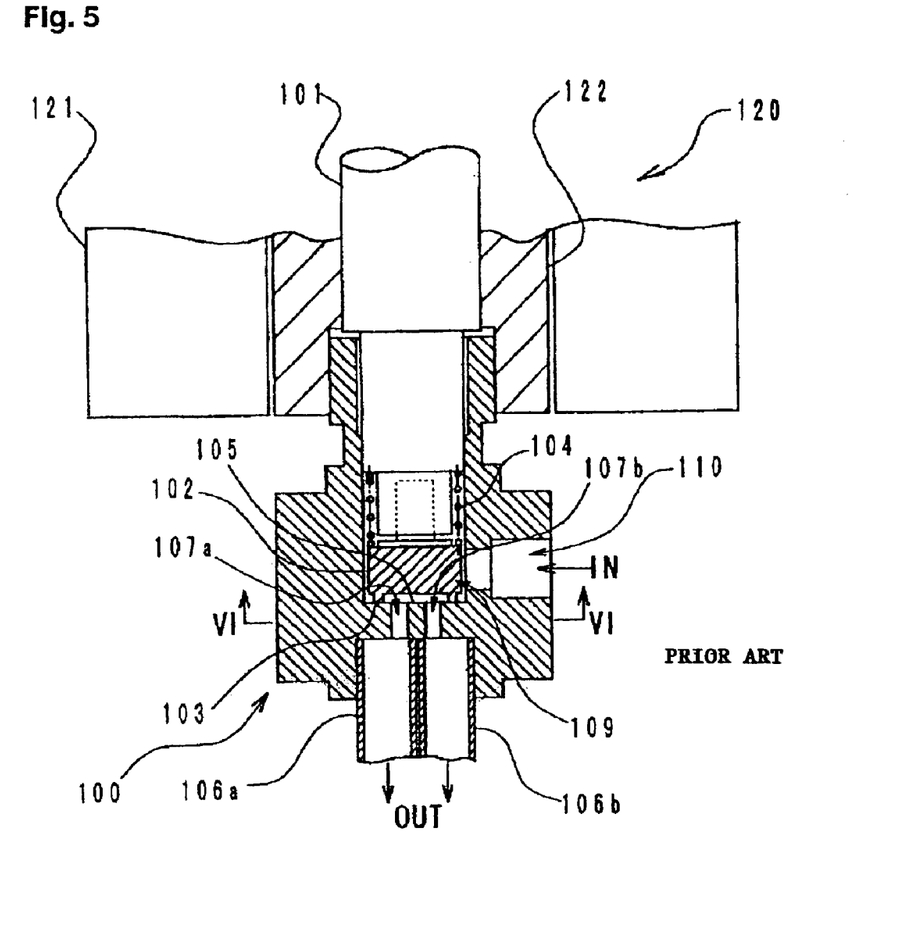
FIG. 5 is a cross-sectional side view of a portion of a configuration of a conventional resin-type three-way valve.

Conventionally adapted as a valve driving device, which is to be applied in a motor-driven refrigerant control three-way valve for a refrigerator, are a resin type or a ball type. FIG. 5 illustrates a cross-section of a portion of the configuration of a resin-type three-way valve 100, and FIG. 6 illustrates plan views of four open-close positions of the three-way valve 100 along the VI—VI line in FIG. 5. The three-way valve 100 can be operated in four modes: open-close mode, close-close mode, close-open mode, and open-open mode. The valve 100 is placed co-axially right under a stepping motor which is indicated by code 120. A rotor 122 is driven though a pulse control by a stator 121 and formed integral with a rotary shaft 101. A resin valve element 102 that rotates together with the rotary shaft 101 is connected to a bottom end of the rotary shaft 101 to freely move co-axially in the axial direction. The valve element 102 moves as a rib 103 protruded on the bottom surface of the valve element is pressed onto a valve seat 105 by the force of a compression spring 104.

The valve seat 105 has communicating holes 107a and 107b, which open inside a valve chamber 109 and are connected with two pipes 106a and 106b. The communication holes 107a and 107b are selectively communicated through an inlet 110 by the valve element 102 inside the valve chamber 109. The rib 103 is shaped to surround a recess portion 111 which is formed like a half-moon, as illustrated in FIG. 6, so that, according to the rotational angle of the rotary shaft 101, a single valve element 102 can control the separation of the communication holes 107a and 107b so as to switch one operational mode to another among the four modes. In other words, when either one or both of the communication holes 107a and 107b, which are provided at two adjacent positions, are surrounded by the half-moon-shaped recess portion 111, the communication of the holes with the inlet hole 110 is disconnected (closed) and the four open-close operational modes as illustrated in FIG. 6 can be obtained according to the rotational angle of the rotary shaft 101 with respect to the two communication holes 107a and 107b.

Figure 6A:
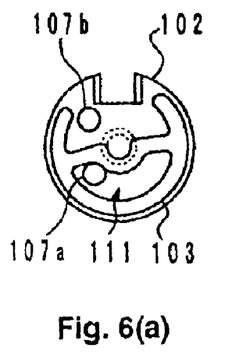
FIG. 6 shows schematic views of the operation of the three-way valve of FIG. 5.
Figure 6B:
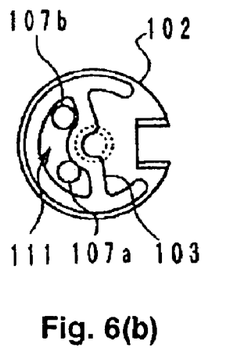
Figure 6C:
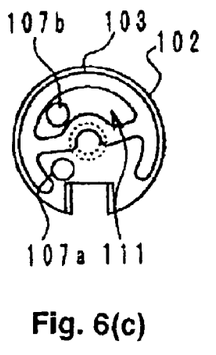
Figure 6D:
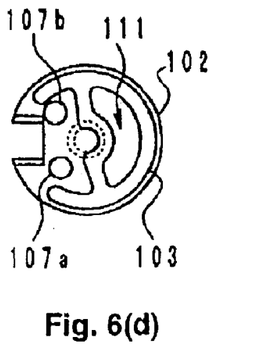

FIG. 6(a) shows that the communication hole 107a is closed and the hole 107b is open; FIG. 6(b) shows that the holes 107a and 107b are both closed; FIG. 6(c) shows that the hole 107a is open and the hole 107b is closed; and FIG. 6(d) shows that the hole 107a and 107b are both open. In the above manner, the valve element 102 is arranged on the same axis as that of the motor rotary shaft 101 so that the valve element is rotated under pressure onto the valve seat 105 at the same speed as the rotary shaft 101 to change the four operational modes with the two communication holes 107a and 107b.

FIG. 7 shows three usual operational modes of a ball-valve-type three-way valve 200. FIG. 7(a) shows openings 204a and 204b in a close-close mode in which both balls 206a and 206b are pressed onto a valve seat (not illustrated) with a protruded surface 210a, which is hatched, of a second cam 210. At that time, a first edge 212a of a control member 212 protruded on the outer circumference comes into contact with a first side edge 213a of a stopper 213 fixed in the valve chamber to determine a mechanical original position which is to be aligned with a driving pulse original position of the rotor 208a. In the second cam 210, the protruded surface 210a and the recessed surface 210b are gently connected by a slope 210c.

Figure 7A:
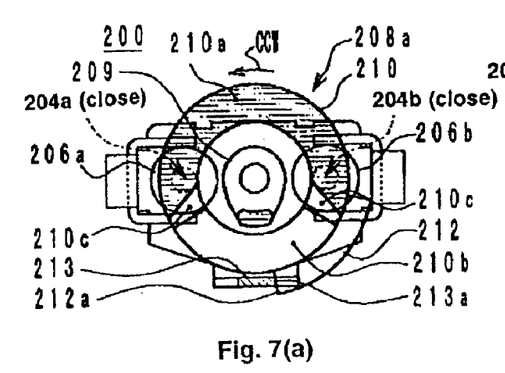
FIG. 7 shows schematic views of the operation of a conventional ball-type three-way valve.
Figure 7B:
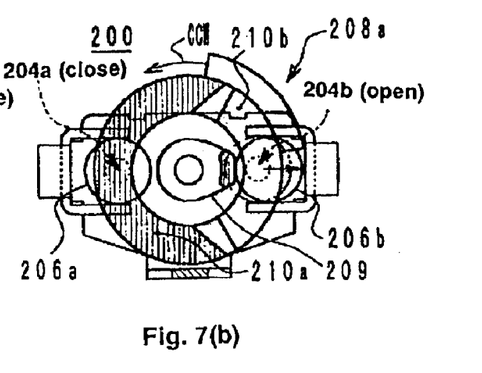
Figure 7C:
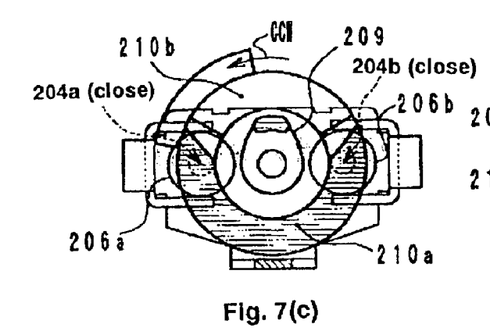
Figure 7D:
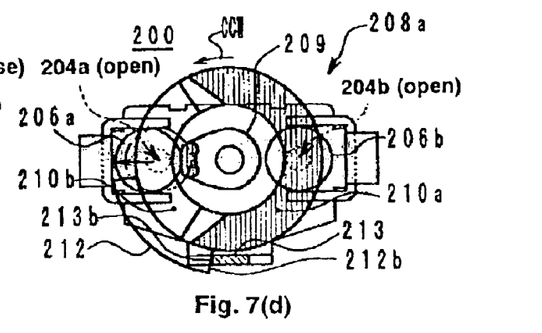

When the rotor 208a is rotated counterclockwise by 90° (see an arrow) from the mode wherein the opening 204a is closed and the opening 204b is closed as illustrated in FIG. 7(a), the ball-type three-way valve 200 becomes the operational mode wherein the opening 204a is closed and the opening 204b is open as illustrated in FIG. 7(b). As the rotor 208a is further rotated by 180°, the valve 200 becomes the operational mode wherein the opening 204a is open and the opening 204b is closed.

When a second edge 212b of the control member 212 reaches the position to make contact with a second side edge 213b of the stopper 213, the rotor can be rotated no further in that direction. With the open-close operational mode configuration of the ball-type three-way valve 200 with the outlet pipes (not illustrated), the valve 200 always passes the close-close mode (see FIG. 7(c)) when the mode is changed from the close-open mode (FIG. 7(b)) to the open-close mode (FIG. 7(d)).

PROBLEMS ADDRESSED BY THE INVENTION

As illustrated in FIG. 7, the three modes except for the open-open mode can be easily configured in a general ball-valve-type three-way valve 200. Compared to the resin-type three-way valve 100 as illustrated in FIG. 5, not only the ball-type three-way valve has a wide distance between the outlet pipes and therefore piping is easy, but also the valve seat is not directly exposed to a welding heat. For this reason, it is desirable that the ball-type three-way valve 200 is operated in the four modes (open-close, close-close, close-open, and open-open) in the same manner as the resin-type three-way valve 100. It is possible to add one more mode to the ball-type three-way valve by adding other mechanisms such as a lever and a shaft.

However, the above mentioned four modes that are applied in the resin-type valve are switched in the order of open-open, open-close, close-close, and close-open. Thus, when the mode is switched from the open-close mode to the close-open mode, the valve needs to pass the close-close mode. The trend in recent years is to save energy and achieve low cost; therefore, a compressor with a low output is popular to use. When the valve passes the close-close mode while switching the mode from the open-close mode to the close-open mode, the load is increased, possibly causing the compressor to stop during that time.

Even if the open-close mode and the close-open mode are arranged next to each other, if there is a moment that the valve openings cannot be maintained open and both valve openings are closed due to the internal pressure of the valve chamber, it causes the compressor to stop. For this reason, it is desirable that the open-open mode is arranged between the open-close mode and the close-open mode so that at least one of the valve openings is always open. Moreover, additional mechanisms, which are needed to obtain all the four modes in the ball-valve-type, increase cost. In addition, the increase in the number of the components increases the failure rate; if the additional mechanisms include a moving mechanism, a life expectancy of the valve is shortened and the frequency of failure is increased, thus decreasing reliability.

OBJECT AND SUMMARY OF THE INVENTION

Then, an object of the present invention is to provide a valve driving device with which, even when the device is connected to an inexpensive compressor with a low output, the compressor is kept from stopping which is normally caused by an excessive load and less electricity is consumed.

To achieve the above object, a valve driving device of the present invention comprises of a main case having one or more inlet pipes through which a fluid flows in from an external compressor and two or more outlet pipes through which the fluid flows out and also having built-in valve elements to open and close openings that are portions of a fluid path for the fluid and are connected to the outlet pipes to flow and stop said fluid; and driving means for driving the valve elements;

wherein when the driving means are driven in the driving direction, the openings and the valve elements together can switch between four operation modes (close-close, open-close, close-open, and open-open) with respect to the two outlet pipes; three or more of the operation modes, including the close-close mode, are obtained; the driving means are driven back and forth while two modes of the three or more modes are assigned to be at both ends of the driving direction; and the close-close mode is assigned to be at one of the ends.

The close-close mode is assigned at the end portion of the rotation range of the driving means. Therefore, even when the driving means moves back and forth while a compressor is driven, if the movement is within the range outside the close-close mode, a load is not applied to the compressor. Also, the valve element is composed of a ball, and two balls are operated by cam surfaces of cam members to open and close the two outlet pipes so that the four modes are established. Also, the cam members have a cam surface with which the restraining forces of the two balls, which are deflected to distant positions from the valve seats, to close the openings, are exerted in opposite directions to cancel the forces with each other so that the open-open mode is maintained with the balanced restraining forces.

DESCRIPTION OF THE PREFERRED EMBODIMENTS

Figure 1:
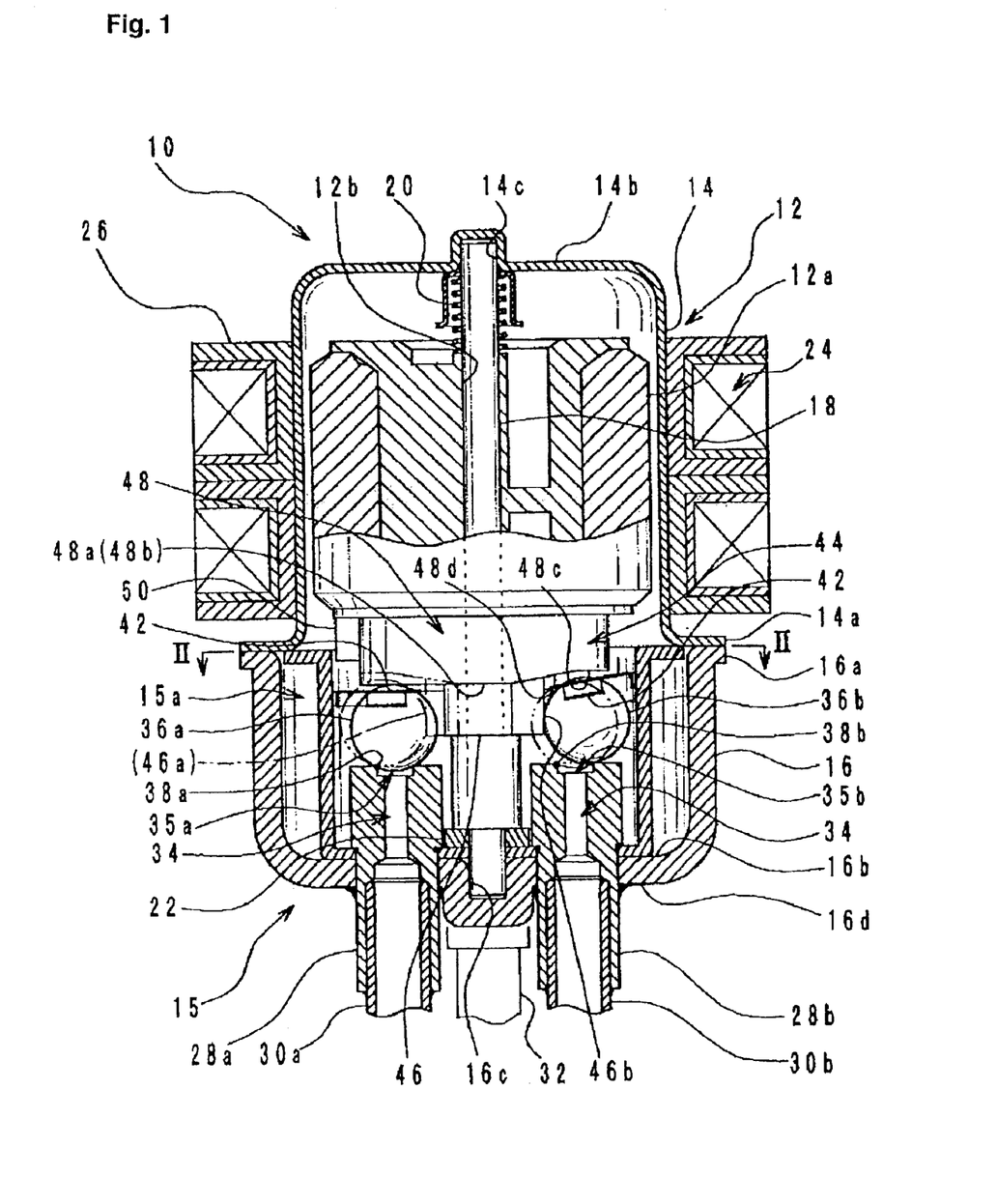
FIG. 1 is a cross-sectional side view of a configuration of a ball-type three-way valve in a valve driving device of the present invention.

Embodiments of a valve driving device of the present invention are described hereinafter based on the drawing. In FIG. 1, code 10 shows a vertical cross-sectional view of a main configuration of an embodiment of a ball-valve-type three-way valve. FIG. 2 is a schematic plan view of the operation of a valve driving device 10 illustrated in FIG. 1.

A rotor case 14 and a case 16 are welded together airtight such that a flange 14a and 16a are joined together. The rotor case 14 mechanically separates a rotor 12a of a stepping motor 12 from the outside, and the case 16 has a valve chamber 15a of a ball-type three-way valve 15. Recesses 14c and 16c are respectively formed in the center of a ceiling 14b of the rotor case 14 and in the center of a bottom surface 16b of a valve chamber case 16, and a support shaft 18 is press-fitted and fixed into the recesses and the casing 14 is centered with the valve chamber case 16.

The rotor 12a is rotatably fitted with a center hole 12b thereof to the support shaft 18 and pressed toward the valve chamber 15a by a spring 20, and a thrust load is supported by a bearing 22. A stator 26 wound with a coil 24 is attached to an outer circumference of the rotor case 14 to control the rotor 12a by a pulse control. Cylindrical valve tubes 28a and 28b are arranged at two positions symmetric about the support shaft 18 on the outside bottom surface 16d of the valve chamber case 16, and are welded upright to the outside bottom surface 16d and parallel to the support shaft 18, maintaining it airtight. In addition, the outlet pipes 30a and 30b are welded airtight respectively to the cylindrical valve tubes 28a and 28b. Further, an inlet pipe 32 is welded airtight to the outside bottom surface 16d of the valve chamber 16 away from the cylindrical valve tubes 28a and 28b.

To valve openings 35a and 35b, through which the through center holes 34 of the cylindrical valve tubes 28a and 28b open inside the valve chamber 15a, the imprinted surfaces, which are created by pressing the balls as the valve elements to the openings, are given to form the valve seats 38a and 38b. A force that returns the balls 36a and 36b to the valve openings 35a and 35b with the internal pressure is always applied to the balls 36a and 36b which are pressed and deflected by cams 46a and 46b (which are described later referring to FIG. 2). However, returning springs 42 composed of flat springs are further provided to make contact with the balls 36a and 36b so that the deflected balls 36a and 36b are securely seated in the valve seats 38a and 38b respectively, and then the cam surfaces 48a and 48b (described later) are pressed from the top to completely close the valve openings 35a and 35b. In other words, a force to bring the balls 36a and 36b back to the valve openings 35a and 35b is constantly applied to the balls 36a and 36b.

A cam member 44 is attached to the bottom end of the rotor 12a to rotate together. The cam member 44 has a first cam 46, a second cam 48 and a control member 50. The first cam 46 has a cam surface that moves the balls 36a and 36b horizontally (in the radial direction); the second cam 48 has a cam surface that moves the balls in the perpendicular direction; and the control member 50 determines the limits for rotation. As illustrated in FIG. 2, the first cam 46 of a wide-opened V-shape is formed in a plane perpendicular to the rotary shaft of the rotor 12a, along a diameter slightly larger than an inscribed circle of a great circle of the balls 36a and 36b in closing positions so that the balls 36a and 36b are deflected outward in the radial direction by fan-shaped convex surfaces 46a and 46b having an appropriate chord length.

A body portion of the first cam 46 is slightly smaller than the inscribed circle of the great circle; the body portion having an arc-like concave surface is formed from the preceding edge of the first convex surface 46a to the following edge of the second convex surface 46b, the surfaces 46a and 46b rotating clockwise. A flank surface extends from the following edge of the first concave surface 46a to contact with the arc-like body portion that is formed smaller than the inscribed circle, and a lead surface extends from the preceding edge of the second convex surface 46b to contact with the arc-like body portion. The flank surface and the lead surface are positioned symmetrically about a plane perpendicular to the line that connects the centers of the valve openings 35a and 35b and includes the rotary shaft of the rotor 12a; the following edge of the first convex surface 46a and the preceding edge of the second convex surface 46b are positioned on both sides of the above mentioned plane perpendicular to the line at equal distances from it.

The second cam 48 is arranged right above the balls 36a and 36b in the figure. A wide primary protruded surface 48a and a narrow secondary protruded surface 48b, which press the balls 36a and 36b onto the valve seats 38a and 38b individually, are formed on the surface which is the opposite side from the valve openings 35a and 35b and faces the balls 36a and 36b, and are respectively connected through the slopes 48d to the surface 48a which does not make contact with the balls 36a and 36b. The first cam 46 and the second cam 48 are positioned such that the convex surfaces of the first cam and the protruded surfaces of the second cam do not superpose in phase in the radial direction.

Next, the operation of the valve driving device 10 is described based on FIG. 2. FIG. 2 illustrates schematic plan views of FIG. 1 along the II—II line by a contour, which shows the device perspectively for a simple description. FIG. 2(a) shows an original position that determines a reference point for the rotation of the rotor 12a; the position with the input pulse "0" is determined as the mechanical original position. Specifically, this is the position at which a first edge 50a of the control member 50 protruded around the outer circumference of the cam member 44 makes contact with the first side edge 51a of the stopper 51 fixed inside the valve chamber 15a. The mechanical original position is adjusted to the driving pulse original point in the electric signal of the rotor 12a. One step of the pulse motor in this embodiment is 3.75°.

Figure 2A:
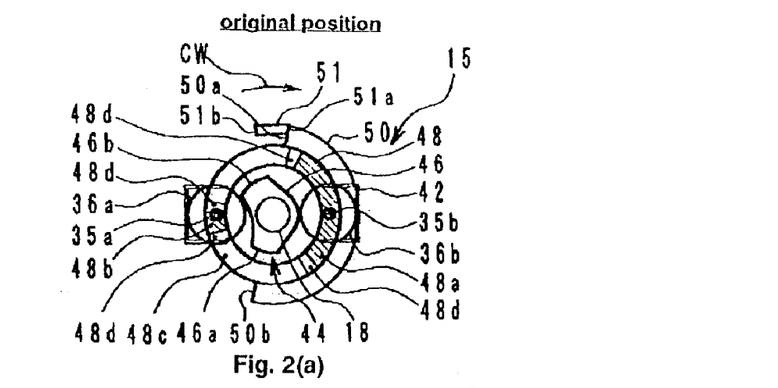
FIG. 2 shows schematic views of the operations of the ball-type three-way valve illustrated in FIG. 1.
Figure 2B:
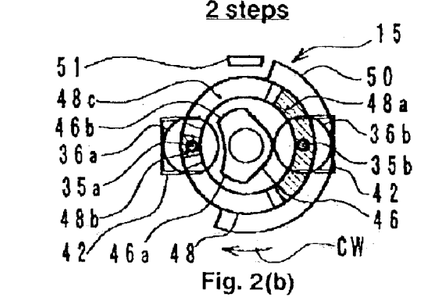

FIG. 2(b) shows the position of the device wherein the rotor 12a of the stepping motor 12 is rotated clockwise by two steps. The narrow secondary protruded surface 48b, which is hatched, of the second cam 48 presses the corresponding ball 36a toward the valve seat 38a and the wide primary protruded surface 48a presses the corresponding ball 36b toward the valve seat 38b. The ball-type three-way valve 15 is now in the mode wherein the valve opening 35a is closed and the valve opening 35b is closed; this mode is arranged to be at one of the ends in the order of the operation modes. When the rotor 12a is in this position, the control signal sends an output to stop the compressor (not illustrated).

Figure 2C:
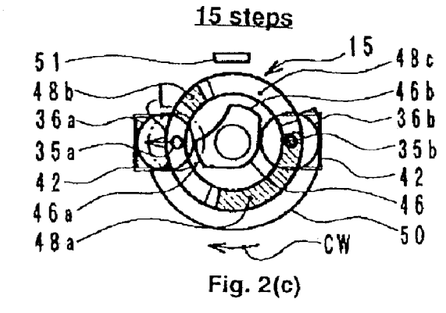

FIG. 2(c) shows the position of the device in which the rotor 12a is rotated clockwise by fifteen steps from the original position. The ball 36b on the right side in the figure is kept pressed toward the valve seat 38b by the protruded surface 48a of the second cam 48 so that the valve opening 35b maintains the close mode. On the other hand, the narrow secondary protruded surface 48b that has pressed the left ball 36a toward the valve seat 38a is moved to release the ball 36a; then, the first cam 46 smoothly brings the preceding edge of the convex surface 46a to contact with the ball 36a from the concave surface of the body portion to deflect the ball from the valve seat 38a in the radial direction. At the stop position of the rotor 12a, the convex surface 46a makes contact with the ball 36a.

In the above, the first cam 46 does not have contact with the right ball 36b and the restraining force of the left ball 36a is exerted on the arcade surface of the first convex surface 46a in the normal direction; therefore, a rotation moment is not applied to the first cam 46. For this reason, without relying on the electric constraint torque property, the first cam 46 firmly supports the ball 36a in a deflection position (by arrow L) to maintain the valve opening 35a in the open mode. Thus, the ball-type three-way valve 15 comes into the mode in which the valve opening 35a is open and the valve opening 35b is closed, and the compressor can be driven with no difficulty.

Figure 2D:
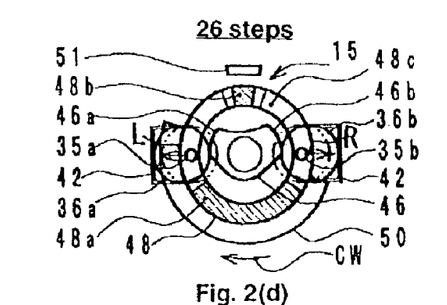

FIG. 2(d) shows the position of the device in which the rotor 12a is rotated clockwise by twenty-six steps from the original position. The ball 36a is continually in contact with the first convex surface 46a to maintain the valve opening 35a open. On the other hand, the primary protruded surface 48a of the second cam 48 releases the ball 36b; then, the first cam 46 smoothly comes into contact with the ball 36b with the lead surface that comes in contact before the preceding edge of the second convex surface 46b and pushes the ball 36b with the preceding edge out of the valve seat 38b in the radial direction; thus, the valve opening 35b comes into the open mode.

At the stop position of the rotor 12a, while the first cam 46 brings the second convex surface 46b into contact with the ball 36b, keeping the first convex surface 46a in contact with the ball 36a, to set the ball-type three-way valve 15 in the mode wherein the valve opening 35a is open and the valve opening 35b is open. At that time, the balls 36a and 36b are pressed by the force of at least the internal pressure or the returning spring 42 in the direction so as to return to the valve seats 38a and 38b. The force of the balls 36a and 36b that is applied to the convex surfaces 46a and 46b of the first cam 46 is exerted equally to the arcade surfaces on both sides in the normal direction; therefore, no rotation moment occurs.

Also, the following edge of the first convex surface 46a and the preceding edge of the second convex surface 46b are at equal distances from the rotary shaft, and the planes extending from these edges are at the symmetric positions. Therefore, when, at the stop position of the rotor 12a, the preceding edge of the second convex surface 46b comes into contact with the right ball 36b and deflects the ball from the valve seat 38b in the push-out position, the left ball 36a is maintained deflected to the push-out position and the following edge of the first convex surface 46a is still in the position so as to maintain the contact with the left ball 36a. Therefore, since the forces exerted on the convex surfaces 46a and 46b of the first cam 46 are of the same strength, no rotation moment occurs. However, when the rotor 12a is moved backward or forward from the stop position shown in FIG. 2(d), i.e., when the convex surfaces 46a and 46b make contact with the flank surface and the lead surface, which extends from the convex surfaces with an angle (in an unstable position), both balls 36a and 36b tend to move toward the surfaces which respectively extend from the convex surfaces 46a and 46b with the restraining force. Thus, a rotation moment is applied to the first cam 46.

In other words, the first cam 46 receives the rotation moment clockwise from the left ball 36a and also receives the rotation moment of the same strength counterclockwise from the right ball 36b. For this reason, due to the balanced rotational torque, the first cam 46 mechanically maintains the rotor 12a in the stop position. Thus, the open-open mode is mechanically constrained without using the constraint torque property of the stepping motor 12 in the above cases. Therefore, the electrification is stopped to save energy. Also, the center of the rotation of the rotor 12a can be adjusted with the line that connects the centers of the valve openings 35a and 35b within a wider allowance range, facilitating assembly of the device.

Figure 2E:
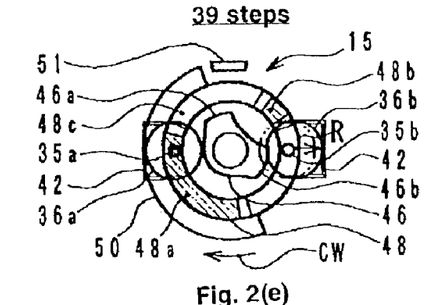

Further, FIG. 2(e) shows the position of the device in which the rotor 12a is rotated clockwise by thirty-nine steps from the original position. In this mode, the position of the rotor 12a is the reverse of that in FIG. 2(c) in which the rotor is rotated by fifteen steps. In other words, the ball 36b on the right side in the figure is kept deflected from the valve seat 38b by the second convex surface 46b of the first cam 46; since the ball 36a on the left side loses the support from the following edge of the first convex surface 46a of the first cam 46, it returns to the valve seat 38a with the force of at least the internal pressure or the returning spring 42.

Then, the ball 36a is pressed onto the valve seat 38a by the protruded surface 48a of the second cam 48 as the cam 48 is rotated. And the ball-type three-way valve 15 comes into the mode wherein the valve opening 35a is closed and the valve opening 35b is open. The restraining force of the right ball 36b which has been deflected by the second convex surface 46b is exerted on the arcuate surface of the second convex surface 46b in the normal direction. Therefore, a rotation moment which is normally caused by the restraining force is not applied to the first cam 46 because the cam 46 has no contact with the left ball 36a. Thus, the first cam 46 firmly supports the ball 36b at the deflection position (by arrow R) to maintain the valve opening 35b open without relying on the electrical constraint torque property of the rotor 12a.

Figure 2F:
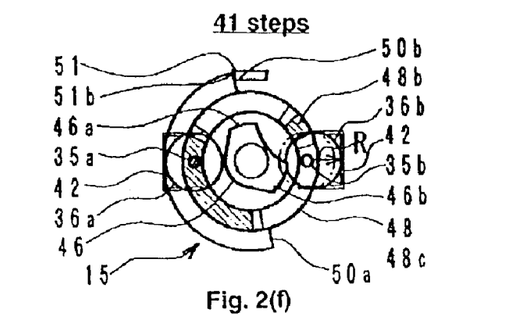

FIG. 2(f) shows the position of the device in which the rotor 12a is rotated clockwise by forty-one steps from the original position. The second edge 50b of the control member 50 comes into contact with the second side edge 51b of the stopper 51 to stop the rotor 12a from rotating. Since the continuous rotation of the rotor is prevented in this manner, the pulse original point for the electrical position control is always accurately in agreement with the original position for the mechanical valve open-close control. According to such a cam configuration in the above embodiment, while the rotor 12a is rotated from the position of two-steps to the position of forty-one steps, the four modes (close-close, open-close, open-open, and close-open) can be obtained. Furthermore, since the close-close mode is not arranged between the open-closed mode and the close-open mode, the compressor is prevented from stopping which is normally caused by an excessive load due to the increase in the internal pressure of the valve chamber 15a. Therefore, the device can be connected with an inexpensive compressor with a low output.

Figure 3:
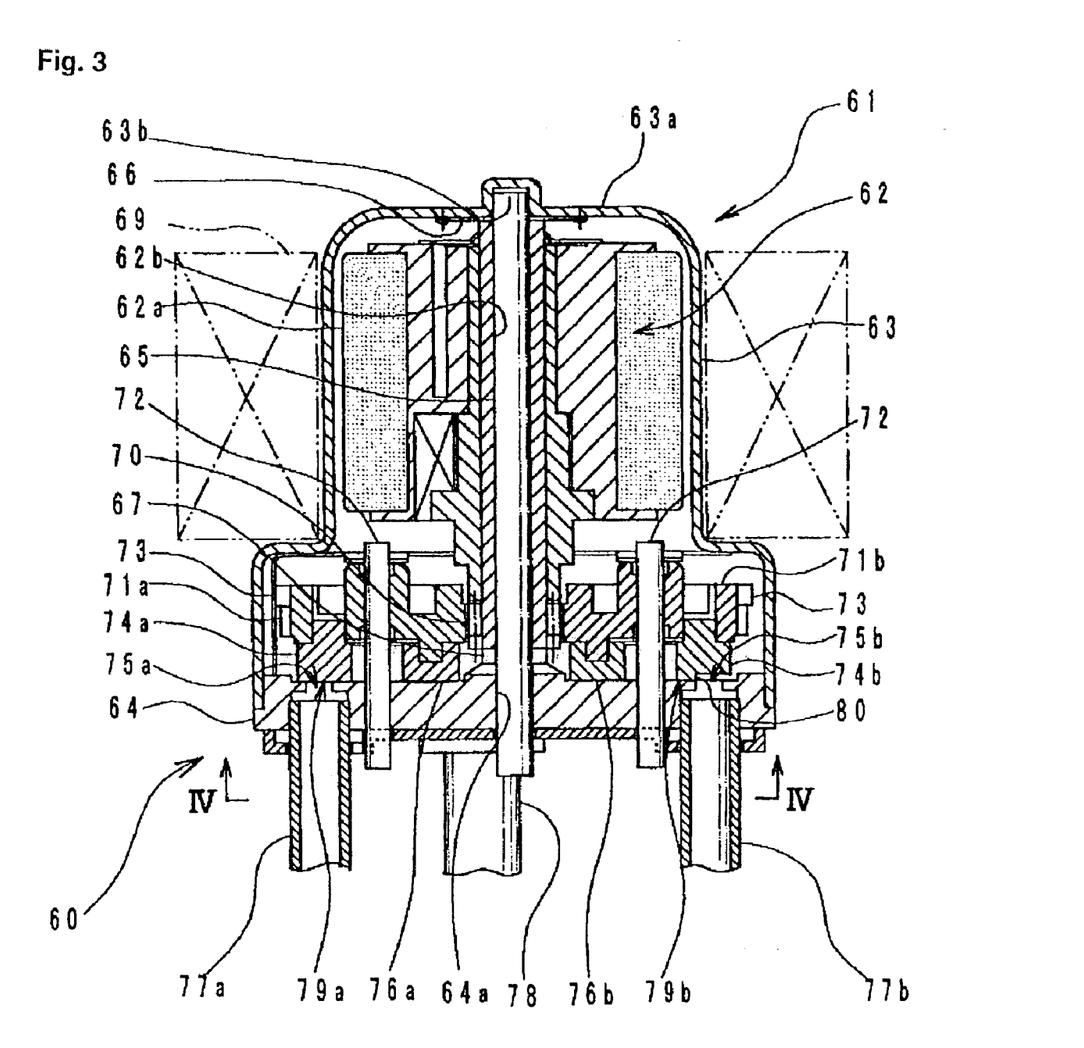
FIG. 3 is a cross-sectional side view of a configuration of a surface-contact-type three-way valve in the valve driving device of the present invention.

Moreover, the main configuration of the valve driving device of the present invention can be applied to a valve driving device 61 that uses a surface-contact-type three-way valve 60 which is described as a second embodiment. A rotor case, which mechanically separates a rotor 62a of a stepping motor 62 from the outside, and the valve chamber are stored in a case 63 and welded airtight to a bottom plate 64. A support shaft 65 is fitted and fixed onto a recess portion 63b provided in a case ceiling 63a and a through hole 64a formed in the center of the bottom plate 64, and then the case 63 and the bottom plate 64 are centered to each other.

The rotor 62a is rotatably fitted to the support shaft 65 by a center hole 62b thereof and pressed toward the bottom plate 64 by a flat spring 66; a thrust load is supported by a bearing 67. A stator 69 wound with a coil is attached to the outer circumference of the case 63 to drive the rotor 62a with a pulse control. A pinion 70 is formed integrally at the bottom end of the rotor 62a on the same axis. A pair of gears 71a and 71b of the same shape are arranged outside the outer circumference of the pinion to be almost symmetric about the shaft so as to mesh with the pinion. The gears 71a and 71b are rotatably supported by fixed shafts 72 which are formed upright on the bottom plate 64 to be parallel to the support shaft 65, and each of them has a rotation control member 73 at a portion of the teeth to control its rotational range. The gears 71a and 71b co-axially rotate flat cam valve elements 74a and 74b which are attached to the bottom surfaces of the gears. The flat cam valve elements 74a and 74b are formed in a disk-like shape with a diameter slightly smaller than the root circle of the gears 71a and 71b.

In the bottom plate 64, valve openings 75a and 75b are formed at appropriate positions which are further outside than the fixed, gear-supporting shafts 72 in the radial direction but are inside the outer diameter of the flat cam valve elements 74a and 74b and closer to the outer periphery of the bottom plate 64. The cam surfaces 76a and 76b formed in the bottom surfaces of the flat cam valve elements 74a and 74b come into contact with and cover the valve openings 75a and 75b. Through holes that create the valve openings 75a and 75b open wider to the outside surface of the bottom plate 64, which is opposite from the valve openings 75a and 75b forming side, and a pair of outlet pipes 77a and 77b are connected airtight thereto. Also an inlet pipe 78 is connected airtight at an appropriate position away from the valve openings 75a and 75b in the bottom plate 64.

In the above configuration, when the rotor 62a is driven by a pulse control and the pinion 70 is rotated clockwise, the flat cam valve elements 74a and 74b are rotated counterclockwise together with a pair of gears 71a and 71b which are meshed with the pinion 70. The flat cam valve elements 74a and 74b have protruded surfaces as contact surfaces 79a and 79b for making contact with the bottom plate 64 that covers the valve openings 75a and 75b, and each of the them has a protruded profile (cam pattern) 80 which border on a non-contacting portion of the bottom plate (see FIG. 4). In other words, the valve openings 75a and 75b are opened and closed as the protruded profile 80 passes through.

The open-close modes of the valve openings 75a and 75b of the flat-contact-type three-way valve 60 by the cam pattern 80 are described based on FIG. 4. FIG. 4 shows perspective drawings of the bottom plate 64 along the IV—IV line in FIG. 3; the portion which is hatched is the contact surfaces 79a and 79b of the flat cam valve elements 74a and 74b. The valve openings 75a and 75b shown in the portion which is hatched are closed. In other words, FIG. 4(a) shows the original position of rotation, in which the rotation control member 73 of the gear 71b is in contact with a tooth of the pinion 70 to stop the counterclockwise rotation and to determine the rotational limits on the other side. Thus, the mechanically original position of the rotor 62a is determined and adjusted with the electrical control pulse original position.

Figure 4A:
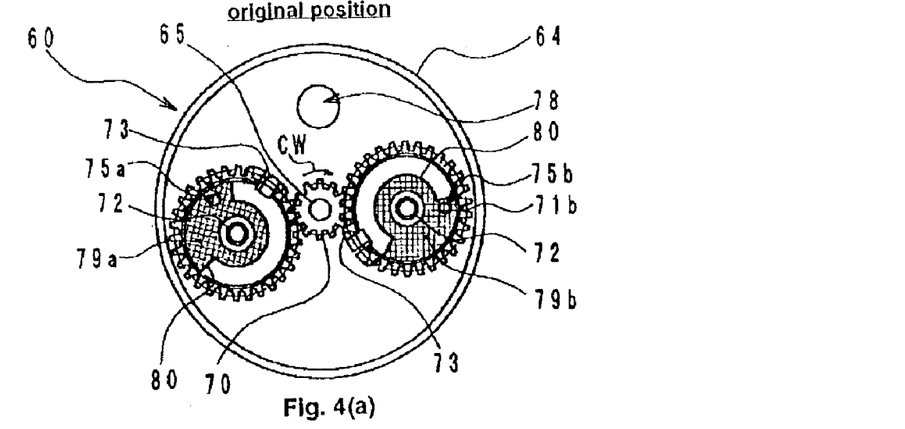
FIG. 4 shows schematic views of the operations of an embodiment of the surface-contact-type three-way valve illustrated in FIG. 3.
Figure 4B:
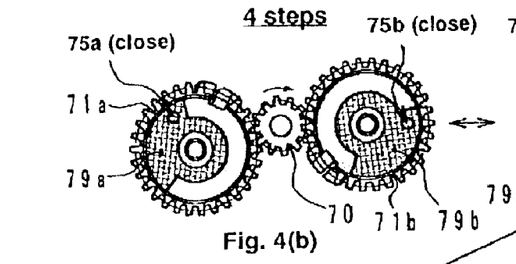
Figure 4C:
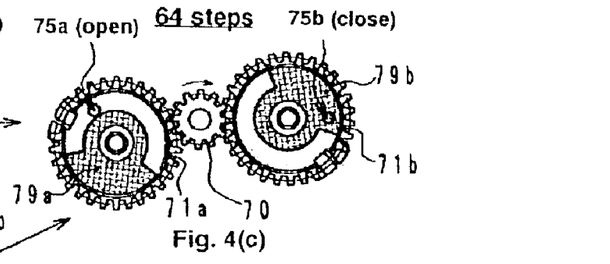
Figure 4D:
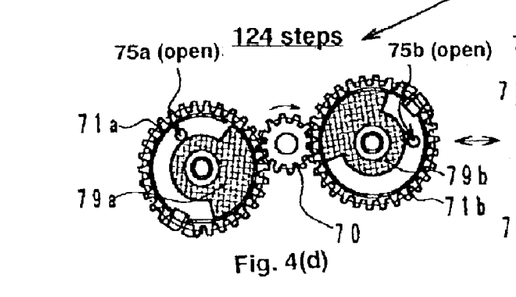
Figure 4E:
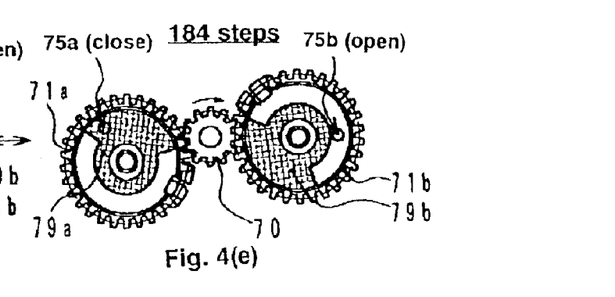
Figure 4F:
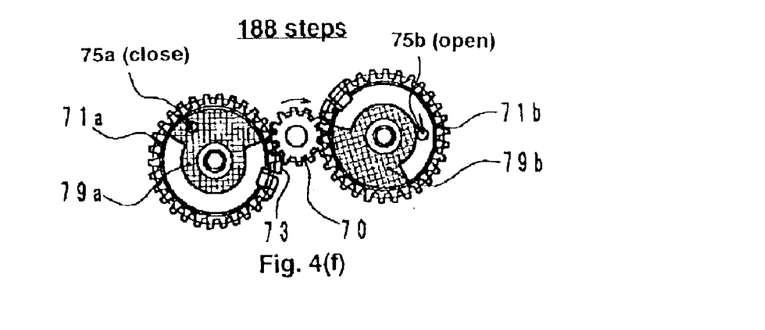

FIG. 4(b) shows the position of the device wherein the rotor 62a is rotated clockwise by four steps from the original position, and the surface-contact-type three-way valve 60 is in the mode wherein the valve opening 75a is closed and the valve opening 75b is closed. This mode is the starting position arranged at one of the ends in the control modes obtained by the back-and-forth movement of the surface-contact-type three-way valve 60. In the same manner, FIG. 4(*c*) shows the position of the device wherein the rotor 62*a* is rotated clockwise by sixty-four steps from the original position. The valve 60 is in the mode in which the valve opening 75*a* is open and the valve opening 75*b* is closed. FIG. 4(*d*) shows the position of the device in which the rotor 62*a* is rotated clockwise by one-hundred-twenty-four steps from the original position. The valve 60 is in the mode in which the valve opening 75*a* is open and the valve opening 75*b* is open. FIG. 4(*e*) shows the position of the device wherein the rotor 62*a* is rotated clockwise by one-hundred-eighty-four steps from the original position, and the valve 60 is in the mode wherein the valve opening 75*a* is closed and the valve opening 75*b* is open.

Further, FIG. 4(*f*) shows that the rotor 62*a* is rotated by one-hundred-eighty-eight steps, and the rotation control member 73 of the gear 71*a* comes in contact with a tooth of the pinion 70 to stop the clockwise rotation and to determine the rotational limits on the other side. Thus, while the rotor 62*a* rotates back and forth within the range controlled by the rotation control member 73, the four modes (close-close, open-close, open-open, and close-open) are obtained. In addition, the mode is always changed from the open-close to the closed-open via the open-open mode, and therefore there is no chance to be in the close-close mode while the refrigerator is running. For this reason, the compressor will not stop during the temperature adjustment by the three-way valve.

Although the embodiments are described as above, the valve driving device of the present invention is not limited to the embodiments illustrated in the figures. The improvements of the shape and configuration are anticipated by modifying the details, re-configuring the components, or changing the combination of the embodiments, such as changing the cam pattern to change the order of the operation modes, within the scope of the present invention.

As understood from the above description, the valve driving device of the present invention comprises a main case having one or more inlet pipes through which a fluid flows in from an external compressor and two or more outlet pipes through which the fluid flows out and also having built-in valve elements to open and close openings that are portions of a fluid path for the fluid and are connected to the outlet pipes to flow and stop the fluid, and driving means for driving the valve elements; wherein when the driving means are driven in the driving direction, the openings and the valve elements together can switch between four operation modes (close-close, open-close, close-open, and open-open) with respect to the two outlet pipes; three or more of the operation modes, including the close-close mode, are obtained; the driving means are driven back and forth while two modes of the three or more modes are assigned to be at both ends of the driving direction; and the close-close mode is assigned to be at one of the ends. Therefore, when the mode is switched from the open-close mode to the close-open mode, there is no chance that all the valves are closed even momentarily. Consequently, the device can be connected to an inexpensive compressor of a low output, and the problem that a compressor stops due to an excessive load can be prevented. Consequently a refrigerator that consumes less electricity and saves maintenance cost can be provided inexpensively.

According to the valve driving device of the present invention, the valve element is composed of a ball, and two balls are operated by cam surfaces of cam members to close and open the two outlet pipes so that the four modes are established. Thus, the four modes can be obtained by the cam, reducing the cost for additional members.

According to the valve driving device of the present invention, the cam members have a cam surface with which the forces of the two balls, which are deflected to distant positions from the valve seats, to return to close the openings are exerted in opposite directions to cancel the forces with each other so that the open-open mode is mechanically maintained with the balanced restraining forces. Consequently the valve driving motor can stop even in the open-open mode, and therefore there is no need of maintaining electrical input, consuming less electricity.

While the foregoing description and drawings represent the present invention, it will be obvious to those skilled in the art that various changes may be made therein without departing from the true spirit and scope of the present invention.

What is claimed is:

1. A valve driving device comprising:
   a main case having one or more inlet pipes through which a fluid flows in from an external compressor and two or more outlet pipes through which said fluid flows out and also having built-in valve elements to open and close openings that are portions of a fluid path for said fluid and are connected to said outlet pipes to flow and stop said fluid; and
   driving means for driving said valve elements;
      wherein when said driving means are driven in the driving direction, said openings and said valve elements together can switch between four operation modes (close-close, open-close, close-open, and open-open) with respect to said two outlet pipes; three or more of said operation modes, including said close-close mode, being obtained; said driving means being driven back and forth while two modes of said three or more modes are assigned to be at both ends of said driving direction; and said close-close mode is assigned to be at one of said ends,
      wherein said valve element is composed of a ball, and two balls are operated by cam surfaces of cam members to close and open said two outlet pipes so that said four modes are established.

2. A valve driving device comprising:
   a main case having one or more inlet pipes through which a fluid flows in from an external compressor and two or more outlet pipes through which said fluid flows out and also having built-in valve elements to open and close openings that are portions of a fluid path for said fluid and are connected to said outlet pipes to flow and stop said fluid; and
   driving means for driving said valve elements;
      wherein when said driving means are driven in the driving direction, said openings and said valve elements together can switch between four operation modes (close-close, open-close, close-open, and open-open) with respect to said two outlet pipes; three or more of said operation modes, including said close-close mode, being obtained; said driving means being driven back and forth while two modes of said three or more modes are assigned to be at both ends of said driving direction; and said close-close mode is assigned to be at one of said ends,
      wherein said valve element is composed of a ball, and two balls are operated by cam surfaces of cam members to close and open said two outlet pipes so that said four modes are established and said cam members have a cam surface profile with which the restraining forces of said two balls, which are deflected to distant positions from said valve seats, to close said openings, are exerted in opposite directions to cancel said forces with each other so that said open-open mode is maintained with said balanced restraining force.

* * * * *